US010949857B2

(12) United States Patent
Tranganidas et al.

(10) Patent No.: US 10,949,857 B2
(45) Date of Patent: Mar. 16, 2021

(54) AMOUNT CONFIRMATION FOR VISUALLY IMPAIRED USERS

(71) Applicant: MasterCard International Incorporated, Purchase, NY (US)

(72) Inventors: Ilias Tranganidas, Forest (BE); Michaël Sass, Uccle (BE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 555 days.

(21) Appl. No.: 15/846,557

(22) Filed: Dec. 19, 2017

(65) Prior Publication Data

US 2018/0181959 A1 Jun. 28, 2018

(30) Foreign Application Priority Data

Dec. 22, 2016 (EP) .................................... 16206437

(51) Int. Cl.
*G06Q 20/40* (2012.01)
*G06Q 20/42* (2012.01)
*G10L 13/00* (2006.01)

(52) U.S. Cl.
CPC ........... *G06Q 20/405* (2013.01); *G06Q 20/42* (2013.01); *G10L 13/00* (2013.01)

(58) Field of Classification Search
CPC ..................................................... G06Q 40/00
(Continued)

(56) References Cited

U.S. PATENT DOCUMENTS 3,896,266 A * 7/1975 Waterbury ............ G07F 7/1075
379/114.19
5,297,031 A * 3/1994 Gutterman ............. G06Q 40/04
705/37
(Continued)

FOREIGN PATENT DOCUMENTS

JP  H11312265 A  11/1999
JP  HII 312265 A  11/1999
(Continued)

OTHER PUBLICATIONS

Viets, "Extended European Search Report", European Patent Application No. 16206437.2, dated Feb. 8, 2017, 9 pages.
(Continued)

*Primary Examiner* — Kirsten S Apple

(57) ABSTRACT

A method for audio based amount confirmation for a visually impaired user of a payment card requesting a payment transaction, the method comprising the steps of associating, during an enrolment process, the payment card to a user terminal, sending, responsive to entering the payment amount at a transaction terminal by the merchant, a notification message to the user terminal, the notification message having a content comprising at least the payment amount and, optionally, additional payment related information, converting, at the user terminal, the content of the notification message into audio data, presenting the audio data to the user, prompting, responsive to presenting the audio data to the user, payment confirmation or decline by the user, generating a respective response message, and processing, responsive to and depending on the content of the response message, the payment or generating an adjustment message to be displayed to the merchant.

20 Claims, 4 Drawing Sheets

(58) Field of Classification Search
USPC .......................................................... 705/35
See application file for complete search history.

(56) References Cited

U.S. PATENT DOCUMENTS

| | | | | |
|---|---|---|---|---|
| 5,915,245 | A * | 6/1999 | Patterson, Jr. | G06Q 20/32 340/4.5 |
| 6,044,134 | A * | 3/2000 | De La Huerga | H04M 3/53333 379/88.08 |
| 6,161,099 | A * | 12/2000 | Harrington | G06Q 30/08 705/36 R |
| 6,321,212 | B1 * | 11/2001 | Lange | G06Q 40/00 705/35 |
| 6,345,090 | B1 * | 2/2002 | Walker | G06Q 10/02 379/114.03 |
| 6,366,682 | B1 * | 4/2002 | Hoffman | G06Q 20/26 382/115 |
| 6,421,653 | B1 * | 7/2002 | May | G06Q 30/08 705/36 R |
| 6,493,683 | B1 * | 12/2002 | David | G06Q 20/02 705/37 |
| H002064 | H * | 5/2003 | Buchalter | 705/37 |
| 6,629,081 | B1 * | 9/2003 | Cornelius | G06Q 20/04 705/30 |
| 6,732,161 | B1 * | 5/2004 | Hess | G06Q 30/06 709/219 |
| 6,768,981 | B2 * | 7/2004 | Patterson, Jr. | G06Q 40/00 705/35 |
| 6,892,186 | B1 * | 5/2005 | Preist | G06Q 30/08 705/26.3 |
| 6,952,682 | B1 * | 10/2005 | Wellman | G06Q 30/08 705/1.1 |
| 7,007,076 | B1 * | 2/2006 | Hess | G06F 12/0223 709/219 |
| 7,478,143 | B1 * | 1/2009 | Friedman | G06Q 30/02 709/203 |
| 7,669,759 | B1 * | 3/2010 | Zettner | G06Q 20/40 235/380 |
| 8,001,035 | B2 * | 8/2011 | Kwan | G06Q 30/08 705/35 |
| 8,682,802 | B1 * | 3/2014 | Kannanari | G06Q 20/401 705/65 |
| 8,762,272 | B1 * | 6/2014 | Cozens | G06Q 20/102 705/40 |
| 9,398,007 | B1 * | 7/2016 | Wegener | H04L 63/0861 |
| 2001/0056372 | A1 * | 12/2001 | Rogan | G06Q 30/02 705/14.12 |
| 2002/0049670 | A1 * | 4/2002 | Moritsu | G06Q 20/102 705/40 |
| 2002/0061094 | A1 * | 5/2002 | Walker | H04L 67/14 379/93.12 |
| 2003/0135459 | A1 * | 7/2003 | Abelman | G06Q 20/102 705/40 |
| 2003/0200153 | A1 * | 10/2003 | Smith, II | G06Q 20/1235 705/26.1 |
| 2004/0014457 | A1 * | 1/2004 | Stevens | G06F 21/32 455/414.1 |
| 2004/0143430 | A1 * | 7/2004 | Said | G06F 40/12 704/2 |
| 2006/0044153 | A1 * | 3/2006 | Dawidowsky | G06K 19/0723 340/4.3 |
| 2007/0061881 | A1 * | 3/2007 | Eyre | G06Q 30/02 726/21 |
| 2007/0179885 | A1 * | 8/2007 | Bird | G06Q 20/10 705/39 |
| 2008/0249951 | A1 * | 10/2008 | Gilder | G06Q 20/04 705/76 |
| 2008/0288405 | A1 * | 11/2008 | John | G06Q 20/40 705/44 |
| 2009/0037173 | A1 * | 2/2009 | Hansen | G06Q 20/40145 704/246 |
| 2009/0063312 | A1 * | 3/2009 | Hurst | G06Q 20/206 705/30 |
| 2010/0078471 | A1 * | 4/2010 | Lin | G06Q 40/02 235/379 |
| 2010/0130172 | A1 * | 5/2010 | Vendrow | H04M 15/00 455/411 |
| 2010/0274691 | A1 * | 10/2010 | Hammad | G06Q 20/3224 705/30 |
| 2011/0131104 | A1 * | 6/2011 | Rose | G06Q 20/32 705/17 |
| 2011/0184843 | A1 * | 7/2011 | Orttung | G06Q 20/14 705/34 |
| 2011/0225064 | A1 * | 9/2011 | Fou | G06Q 20/385 705/26.41 |
| 2012/0191605 | A1 * | 7/2012 | Foster | G06Q 40/02 705/40 |
| 2012/0267432 | A1 * | 10/2012 | Kuttuva | G06Q 20/26 235/379 |
| 2012/0271712 | A1 * | 10/2012 | Katzin | G06Q 20/3274 705/14.51 |
| 2013/0013499 | A1 * | 1/2013 | Kalgi | G06Q 20/34 705/41 |
| 2013/0061055 | A1 * | 3/2013 | Schibuk | G06Q 20/223 713/172 |
| 2013/0339188 | A1 * | 12/2013 | Mohamed | G06Q 20/027 705/26.41 |
| 2014/0156510 | A1 | 6/2014 | Howe | |
| 2014/0351147 | A1 * | 11/2014 | Castrechini | G06Q 20/20 705/79 |
| 2015/0006390 | A1 * | 1/2015 | Aissi | G06Q 20/32 705/44 |
| 2015/0081462 | A1 | 3/2015 | Ozvat et al. | |
| 2015/0106216 | A1 * | 4/2015 | Kenderov | G06Q 20/3224 705/21 |
| 2015/0348044 | A1 * | 12/2015 | Smith | G06Q 20/4012 705/72 |
| 2016/0371699 | A1 * | 12/2016 | Proctor | G06Q 20/3226 |
| 2017/0359396 | A1 * | 12/2017 | Gapasin | H04L 65/4076 |
| 2018/0165686 | A1 * | 6/2018 | Bacon | G06F 16/9535 |

FOREIGN PATENT DOCUMENTS

| | | |
|---|---|---|
| JP | 2010 108196 A | 5/2010 |
| JP | 2010108196 B2 | 5/2010 |
| KR | 940 000 092 B1 | 1/1994 |
| KR | 940000092 B1 | 1/1994 |
| WO | 2016/087157 A1 | 6/2016 |
| WO | 2016087157 A1 | 6/2016 |

OTHER PUBLICATIONS

Viets, "Extended European Search Report", European Patent Application No. 16206437.2, dated Feb. 17, 2018, 9 pages.

Young, "International Search Report and Written Opinion", International Patent Application No. PCT/US17/60274, dated Jan. 29, 2018, 9 pages.

Viets, A., "Communication", European Patent Application No. 16 206 437.2, dated Mar. 23, 2020, 6 pages.

Viets, A., "Communication", European Patent Application No. 16 206 437.2, dated Aug. 9, 2019, 6 pages.

Viets, A., "Communication", European Patent Application No. 16 206 437.2, dated Jan. 23, 2019, 6 pages.

Viets, A., "Communication, Extended European Search Report", European Patent Application No. 16 206 437.2, dated Feb. 8, 2017, 9 pages.

* cited by examiner

AMOUNT CONFIRMATION FOR VISUALLY IMPAIRED USERS

CROSS REFERENCING OF RELATED APPLICATIONS

This application claims priority to European Patent Application No. 16206437.2, filed on Dec. 22, 2016, entitled "Amount Confirmation for Visually Impaired Users", which is incorporated by reference herein in its entirety.

TECHNICAL FIELD

The present disclosure relates to the field aids for visually impaired users. More particularly, the present disclosure relates to a method for audio based amount confirmation for a visually impaired user of a payment card requesting a payment transaction. Moreover, the disclosure relates to a computer program product and a computer readable medium. The computer readable medium comprises computer-executable instructions, which, when executed by the respective device(s) being equipped with processors causing the device(s) to perform the method steps of the disclosure on the respective device.

BACKGROUND

In daily business price labelling, invoices and receipts are normally printed or hand written. Accordingly, visually impaired persons but also illiterate persons have to rely on the accuracy of an indicated amount or on other persons reading out the value shown on the label or invoice. While the risk of paying a wrong amount when using cash, either by mistake or because of fraud is manageable, as the person knows the product/service he is paying for and knows the amount of money he is handing over, it might be different when using modern, electronic payment methods.

As one of these methods, the use of payment cards, such as for example debit cards or credit cards, has become a well accepted supplement or even substitute for any kind of payments. For processing a payment, the respective amount is associated with the payment card and presented for authorisation to the user. In a normal process of a so-called card present transaction, the payment card information is either manually entered in a payment terminal or is captured by reading out the information stored on the payment card by the terminal. Similar to this, the payment amount is entered into the terminal or transferred from cash register system to the terminal. The payment amount to be processed is presented to the user for authorisation. This presentation is either in form of a paper printout or displayed on a display of the terminal, but in any case in form of a visual presentation.

As the authorisation is based on the visual presentation of the amount to be paid, visually impaired users have to trust the merchant, the cash register system or a third party "translating" the written information in audio information when authorizing a payment. As the payment card is normally associated to the user's bank account, the amount that can be transferred may be much higher than the amount of cash the users is carrying with him. According to this, the risk of authorising a "wrong" amount, irrespective whether this has been entered by mistake or by intention, is higher than by cash payments. Due to this limitation, visually impaired persons are often reluctant to use a payment card and are therefore limited to the use of other payment method

SUMMARY OF THE INVENTION

The present disclosure provides one or more solutions to the problems and disadvantages of the background art. Other technical advantages of the present disclosure will be readily apparent to one skilled in the art from the following description and claims.

The present disclosure is directed to a computer implemented method for audio based amount confirmation for a visually impaired user of a payment card requesting a payment transaction:
  associating, during an enrolment process, the payment card to a user terminal of the visually impaired user;
  sending, responsive to entering the payment amount at a transaction terminal by the merchant, a notification message to the user terminal, the notification message having a content, the content comprising at least the payment amount and, optionally, additional payment related information;
  converting, at the user terminal responsive receiving the notification message, the content of the notification message into audio data;
  presenting the audio data corresponding to the content of the notification message to the user;
  prompting, responsive to presenting the audio data to the user, payment confirmation or decline by the user;
  generating a response message comprising the payment confirmation or decline;
  processing, responsive to and depending on the content of the response message, the payment or generating an adjustment message to be displayed to the merchant and prompting amendment of the payment amount.

The present disclosure includes multiple aspects for audio based amount confirmation for users of a payment card requesting a financial transaction to be processed form the payment card. The payment card may be a credit card or a debit card associated to a bank account of the user, but also soft cards installed on a user terminal representing an electronic version of the actual payment card.

The financial transaction may be a card present transaction, i.e. a transaction in which the user of the card directly interacts with the commercial partner, e.g. the merchant or the bank, and directly uses the physical payment card or the soft card issued on a user terminal for requesting the transaction. Non-limiting examples for card present transactions are purchases in a shop of a merchant paid by credit or debit card (or a corresponding soft card), where the required card information is read out from the card by a transaction terminal or cash withdrawals at an ATM machine.

The transaction terminal may be any terminal used for initiating card-present transactions which is capable to connect to a network. Non-limiting examples of transaction terminals are point-of-sale (POS) terminals or ATM machines or the like. The transaction terminal may be operable connected to the payment processing network. In addition, the transaction terminal may provide means for communicating via additional communication channels; not limiting examples for additional communication channels are LAN- or WIFI connections, Bluetooth® connection, NFC connections, infrared connections or any other communication channels know to the person skilled in the art.

The user terminal may be any device connected to a network such as the internet and providing an interface to interact, directly or indirectly, with a card network and to receive instructions from the user to confirm or challenge the amount to be processed by a card present transaction, such as smartphones, personal computers, tablet computers configured to execute a respective application or capable to connect to a respective web-service over a network. The user terminal may capable to communicate via other communication channels such NFC, Bluetooth®, infrared, but also indirect communication channels such as text or barcode interpretation. The user terminal may further be capable to execute a text to speech or data to speech application or command for concerting incoming messages such as the notification message into audio data which can be understood by the visually impaired user. The user terminal may also comprise means for user authentication, e.g. means for capturing biometric data for authenticating the user in order.

In order to enable the audio based amount confirmation method for the user, the user starts, prior to requesting a card present transaction, an enrolment process. During this enrolment process, the user terminal associated to the user is associated to the payment card of the user, which shall be used for subsequent card present transactions. During the enrolment process, the user terminal may be associated to a single or to various payment cards. The enrolment process may also be repeated in order associate the user terminal to further payment cards. In addition, during the enrolment process the user may define the validity of the association, e.g. whether the association shall only be valid for a certain period of time, or only for certain kinds of purchases. By doing so, also the requirement of the additional confirmation step may be limited. According to this, it may be defined that certain types of card present transactions may not require the additional confirmation process.

After the enrolment process, the user terminal information of the user terminal associated to the payment card is stored. The user terminal information may be stored at various instances. For example, the user terminal information may be stored at the card issuer. Alternatively, or in addition to this, the user terminal information may be stored on the payment card. The user terminal information may include information sufficient to transmit information to the user terminal. Accordingly, the user terminal information may include a unique identifier, such as a telephone number, a MAC address or any other suitable identifier. The user terminal information may also include preferred or available communication channels. The required identifier depends on the communication channel selected for transmitting information to the user terminal. For example, if the information is to be send via a mobile communication network, such as a GPRS, 3G, or 4G network, the mobile telephone number may be the appropriate identifier to be used.

After a successful enrolment process, when the user is making a purchase in wants to do a payment using his payment card in form of a card present transaction and the payment card data has been read out by the transaction terminal and the transaction amount has been entered to the transaction terminal, a notification message is generated and sent to the user terminal. When the transaction terminal is a POS terminal, the payment card is normally entered into the card reader or located close to the terminal (e.g. in case of NFC connection of a NFC enabled payment card ort a soft card issued to a user terminal), in order to read out the payment card information and the payment amount is entered by the merchant. When the transaction terminal is a ATM machine, the payment card is normally entered to the machine and the user enters the amount for the transaction, i.e. the amount for the cash withdrawal request. Alternatively when the ATM support contactless data transfer, such as NFC connection of a NFC enabled payment card, the required payment card information is read from the payment card and the transaction is processed as when the card is entered to the machine as described before.

The notification message has a content. The content of the notification message comprises at least the payment amount, but the content may comprise further payment related information, such as time and date of the requested transaction, involved parties of the transaction, e.g. information identifying the merchant or the bank providing the ATM machine, and or geo-information regarding the location where the transaction is requested.

The notification message may be generated at different entities involved in the payment process, and this may depend on the storage location of the user terminal information associated to payment card used. The notification message may be generated at the payment card issuer. In this case, the notification message may be generated and sent to the user terminal responsive to receiving the payment authorisation request from the acquirer, e.g. the bank of the merchant. In this case, the payment card issuer may send, prior to sending the payment authorisation response, the notification message to the user terminal.

Alternatively, when the user terminal information is stored on the payment card and when the transaction terminal comprises respective communication means in order to communicate directly with the user terminal via the communication channels indicated in the user terminal information, the notification message may be generated on the transaction terminal and may be sent to the user terminal via the appropriate communication channel.

At the user terminal, after receiving the notification message, the content is converted into audio data and the generated audio data is provided to the user via the speakers of the user terminal or headphones plugged into the user terminal. Subsequently, after the audio data is presented to the user, the user terminal may prompt the user to either confirm or to decline the amount of the payment. Responsive to the user reaction, a response message is created. The response message indicates the user reaction, such that the content of the response message is either a confirmation or a decline of the amount previously presented for confirmation. In addition, the response message may include a corrected payment amount entered by the user. In addition to this, prior to the creation of the response message, an authentication process for identifying the user may be initiated at the user terminal. This authentication process may be based on a password or PIN query, but also a biometric or two factor identification. Also additional or different authentication methods known to the person skilled in the art may be applied.

The user may inform the merchant directly about his decision and, depending thereon may request adjustment of the amount. If the amount is confirmed the, payment may be processed. If the amount requires adjustment, the process may be reinitiated after amending the amount at the transaction terminal in order to provide the user the possibility to check and confirm the amended amount.

Alternatively or in addition to this, the response message may be sent back to the sender of the notification message using the same or another communication channel. According to this, when the notification message was sent from the payment card issuer via a mobile communication network, the response message may be sent via the same network back to the payment card issuer. The payment card issuer may than either process the payment, when the response message include confirmation by the user, and sent the payment authorisation response to the acquirer. Alternatively, when the response message includes a decline, the payment card issuer may block the payment for processing. In this case, instead of sending the payment authorisation response, the payment card issuer may send an adjustment message, which may than be displayed on the transaction terminal.

If the notification message was sent by the transaction terminal, the user terminal may send back the response massage to the transaction terminal. In addition to this, a message may also be sent to the card issuer, indicating allowance or decline of the payment. Alternatively, or in addition to this, if the response message is confirmative, the payment request may be marked as authorised at the transaction terminal and the subsequent payment authorisation request sent from the acquirer to the payment card issuer will include the confirmation information such that the payment will be processed. In contrast, when the response message indicates decline of the payment, generation of a payment authorisation request is blocked and an adjustment message is generated.

Responsive to the presence of an adjustment message at the transaction terminal, the transaction terminal prompts the person entering the amount, e.g. the merchant at a POS terminal or the user at an ATM machine, to correct the amount of the payment transaction. If the response message includes a corrected amount, this corrected amount may be presented as selection for adjustment of the payment amount. After an amended amount has been entered at the transaction terminal, the process may be reinitiated, in order to get confirmation of the user and to process the financial transaction.

The present disclosure is also directed to a system for amount confirmation for a user of a payment card requesting a payment transaction, the system comprising a transaction terminal configured to communicate with a payment card and with a user terminal, wherein the transaction terminal reads out the user terminal information from the payment card and initiates a communication channel with the user terminal according to the user terminal information.

The transaction terminal may be any terminal used for initiating card-present transactions which is capable to connect to a network. Non-limiting examples of transaction terminals are point-of-sale (POS) terminals or ATM machines or the like. The transaction terminal may be operable connected to the payment processing network. In addition, the transaction terminal may provide means for communicating via additional communication channels; not limiting examples for additional communication channels are LAN- or WIFI connections, Bluetooth® connection, NFC connections, infrared connections or any other communication channels know to the person skilled in the art.

The user terminal may be any device connected to a network such as the internet and providing an interface to interact, directly or indirectly, with a card network and to receive instructions from the user to confirm or challenge the amount to be processed by a card present transaction, such as smartphones, personal computers, tablet computers configured to execute a respective application or capable to connect to a respective web-service over a network. The user terminal may capable to communicate via other communication channels such NFC, Bluetooth®, infrared, but also indirect communication channels such as text or barcode interpretation. The user terminal may further be capable to execute a text to speech or data to speech application or command for concerting incoming messages such as the notification message into audio data which can be understood by the visually impaired user. The user terminal may also comprise means for user authentication, e.g. means for capturing biometric data for authenticating the user in order.

The user terminal information may include information sufficient to transmit information to the user terminal. Accordingly, the user terminal information may include a unique identifier, such as a telephone number, a MAC address or any other suitable identifier. The user terminal information may also include preferred or available communication channels, depending on the capabilities of the user terminal. The required identifier depends on the communication channel selected for transmitting information to the user terminal. For example, if the information is to be sent via a mobile communication network, such as a GPRS, 3G, or 4G network, the mobile telephone number may be the appropriate identifier to be used. Alternatively, identifiers for NFC communication may be used.

In another embodiment of the present disclosure, the transaction terminal may send, responsive to entering the payment amount at the transaction terminal by the merchant, a notification message to the user terminal, the notification message having a content, the content comprising at least the payment amount and, optionally, additional payment related information.

After confirmation by the user, the transaction terminal may receive a response message from the user terminal, the response message indication confirmation or decline of the payment amount. Depending of on the content of the response message, the transaction terminal may either, if the content is confirmative, continue processing of the payment, or, alternatively generate and present an adjustment message, prompting correction of the payment amount.

The present disclosure is also directed to a computer program product comprising program instructions for carrying out each of the method steps of the disclosure, when said product is executed on a computer.

Furthermore, the present disclosure is directed to a computer readable medium storing program instructions, which, when executed by a processor of a computer cause the computer to perform each of the method steps of the disclosure.

One advantage that may be realized in the practice of some embodiments of the described methods is that raw data of biometric samples can electronically be stored securely and may be consolidated and rebuilt for verification of doubtful biometric authentication processes. Other technical advantages of the present disclosure will be readily apparent to one skilled in the art from the following description of preferred embodiments and the claims. Various embodiments of the present application obtain only a subset of the advantages set forth. No single advantage is critical to the embodiments. Any claimed embodiment may be technically combined with any other claimed embodiments.

Figure 1:
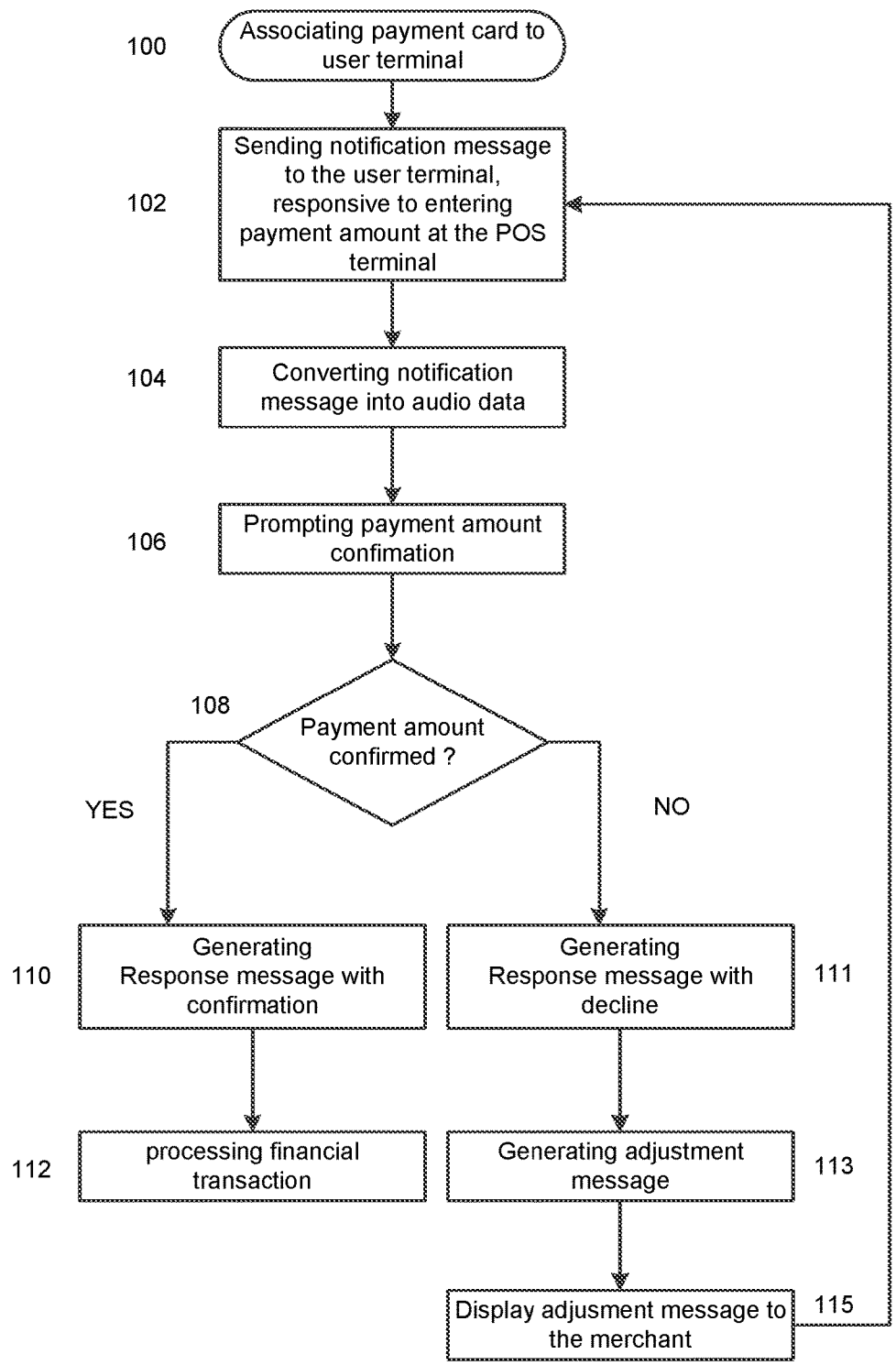
FIG. 1 shows a flowchart of the overall process for audio based amount confirmation.

The accompanying drawings illustrate exemplary embodiments of the disclosure and serve to explain, by way of example, the principles of the disclosure.

DETAILED DESCRIPTION

The present disclosure will now be described more fully hereinafter with reference to the accompanying figures, in which preferred embodiments are shown. The method, however, may be embodied in many different forms and should not be construed as limited to the embodiments set forth herein. It should be noted that these figures are intended to illustrate the general characteristics of the methods utilized in certain embodiments. However, the figures may not precisely reflect the precise structure or performance characteristic of any given embodiment. Moreover, in the figures like reference numerals designate corresponding parts throughout the different views or embodiments.

FIG. 1 shows the flowchart of the audio based amount confirmation process. At step 100, during an enrolment process prior to the actual audio based payment amount confirmation process, the payment card of the user is associated with the user terminal. With this enrolment process, user terminal information, such as a mobile telephone number used with a smart phone, is linked to the payment card information. This linkage be in form of a respective database entry at the level of the card issuer. Alternatively or in addition, the user terminal information may be stored on the payment card.

After successful termination of the enrolment process, when the user wants to make a purchase making use of his payment card, the user passes the payment card to the other party, e.g. a merchant, and the payment card is used at a point of sale terminal for initiating the payment request. In order to initiate the payment process, the merchant also enters the payment amount at the POS terminal. After the payment amount has been entered, at step 102 a notification message is sent to the user terminal. When the user terminal information is stored at the card issues, the notification message is generated in response to receiving the payment authorisation request and is sent from the card issuer to the user terminal. Alternatively, when the user terminal information is stored on the payment card, the notification message can be created at the POS terminal and can be sent from the POS terminal to the user terminal. The notification message contains at least the payment amount of the purchase, but may also contain additional information related to the purchase, such as merchant identity, time of the purchase and/or the respective goods or services.

At the user terminal, at step 104, when the notification message is received, the content of the message is converted into an audio signal which can be reproduced using any audio reproduction means available on the user terminal, such as speakers or headphones. The conversion and the subsequent reproduction is performed by a respective application installed and executed on the user terminal. After the audio information is presented to the user, the user is prompted, at step 106, to confirm or to decline the payment amount. The prompting for confirmation may also be audio based. In addition, the application may also ask for user authentication. The authentication process may take place prior or after the presentation of the audio data. The authentication may be requested on initiating the application or may be requested just before or after the user input at step 108 confirming or declining the payment amount. After the user input is received a response message is generated. The content of the response message depends on the user in punt.

If the user confirms the payment amount, a response message with confirmation s generated at step 110 and, subsequently, the financial transaction is processed. In order to process the financial transaction, the response message is sent back to the entity which has sent the notification message. If the response message is sent back to the card issuer, conformation of the payment amount triggers the generation of a payment authorisation response and as such the payment transaction is processed.

If the response message is sent back to the POS terminal, generation of a payment authorisation request is triggered at the POS terminal. The payment authorisation process, indicating approval of the payment amount is sent for processing via the acquirer to the card issuer.

Alternatively, if the user declines the payment amount, a response message with decline is generated at step 111. The generation of the response message triggers, at step 113, the generation of an adjustment message. Similar to the process after confirmation, the adjustment message is created at the card issuer and then transmitted to the POS terminal or directly at the POS terminal. The adjustment message is presented to the merchant at the card terminal at step 115. The message may be displayed on the POS terminal. The merchant is invited to amend the payment amount. After an amended payment amount has been entered, the process for amount confirmation is reinitiated to start again with step 102.

Figure 2:
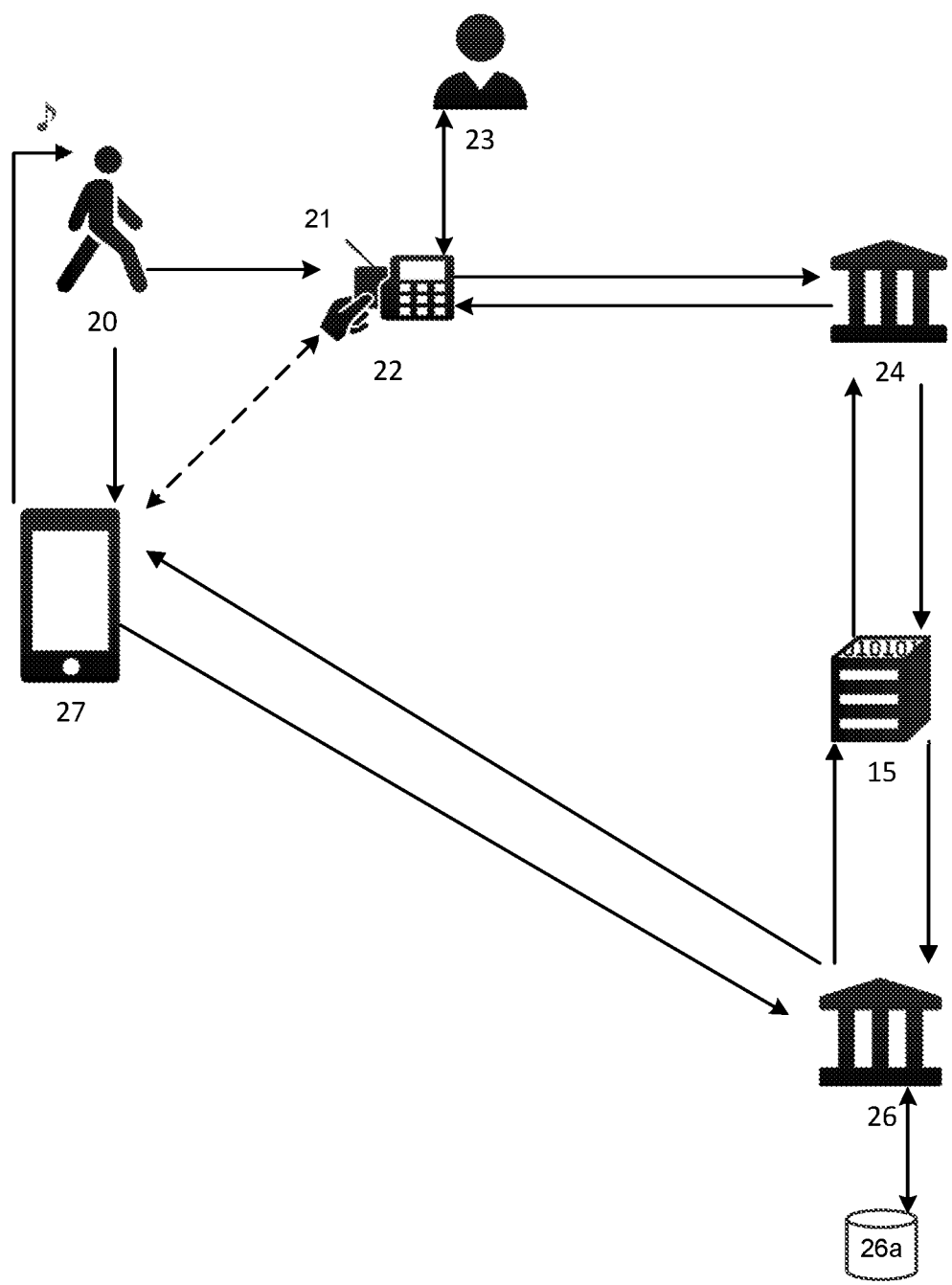
FIG. 2 shows a flowchart of the audio based amount confirmation process according to a first embodiment of the invention.

FIG. 2 shows the transaction flow between the entities involved in processing a card present transaction including the audio based amount confirmation according to the disclosure. A user 20 has concluded an enrolment process an associated his user terminal 27 with his payment card 21. The user terminal information, in this case the telephone number associated to the user terminal, is linked to the payment card. This information is stored in a database 26a at the card issuer 26.

The user 20 now wants to make a purchase in the shop of a merchant 23. For doing the payment, the user 20 decides to use a payment card and to process the payment as a card present transaction and provides the merchant 23 with his payment card 21 in order to initiate the payment transaction request. The merchant enters the payment card 21 into the POS terminal 22 and enters the necessary information for generating a payment authorisation request for processing the payment. The information added includes the payment amount.

The payment authorisation request is transmitted to the acquirer 24 for further processing. The acquirer 24 transmits the payment authorisation request to payment processing network 25, which directs the request to the corresponding payment card issuer 26. The payment card issuer 26 checks in the corresponding database 26a, whether user terminal information associated with the payment card 11 used for the purchase have been stored. If user terminal information has been stored, the payment card issuer sends a notification message to the user terminal 27 indicated in the database entry in the database 26a. The message is send via a mobile communication network and the content of the message includes at least the payment amount of the payment corresponding to the purchase, which needs confirmation.

At the user terminal 27, the content of the notification message is converted into audio data. Typically, the conversion of the notification data into audio data is done by a dedicated application installed and executed on the user terminal. The conversion process is triggered by reception of the notification message. The generated audio data is presented to the user 20 by the dedicated application making use of the sound reproduction means available at the user terminal. Accordingly, at least the amount of the payment, but also additional information such as merchant identification and the like, is presented as audio reproduction of the information to the user. After presentation of the audio data, the dedicated application prompts the user 20 for confirmation or decline of the payment amount. By this, the user 20 con confirm or decline whether the payment amount entered by the merchant is correct or not. In addition, depending on the security settings made during the enrolment process and/or made during initialisation of the application on the user terminal 27, user authentication is prompted by the application.

Subsequently, a response message is created. The response message comprises either the confirmation or the decline based on the user reaction. The response message is sent back to the payment card issuer 26. Depending on the content of the response message, the payment card issuer either continues processing the payment, when the response message is confirmative, by transmitting the payment authorisation response via the payment processing network 25 to the acquirer 24. Alternatively, if the response message indicated decline of the payment amount, the payment card issuer transmits an adjustment message via the payment processing network 25 to the acquirer 24. The adjustment message is transmitted to the POS terminal 22. At the POS terminal 22, the adjustment message triggers the generation of an invitation to adjust the payment amount to be displayed on the POS terminals display. After amendment of the payment amount by merchant 23, the process is reinitiated.

Alternatively, the user 20 may, after presentation of the content of the notification message, directly inform the merchant 23 that the entered amount is incorrect and ask him for correction. After amendment of the payment amount by merchant 23, the process is reinitiated.

Figure 3:
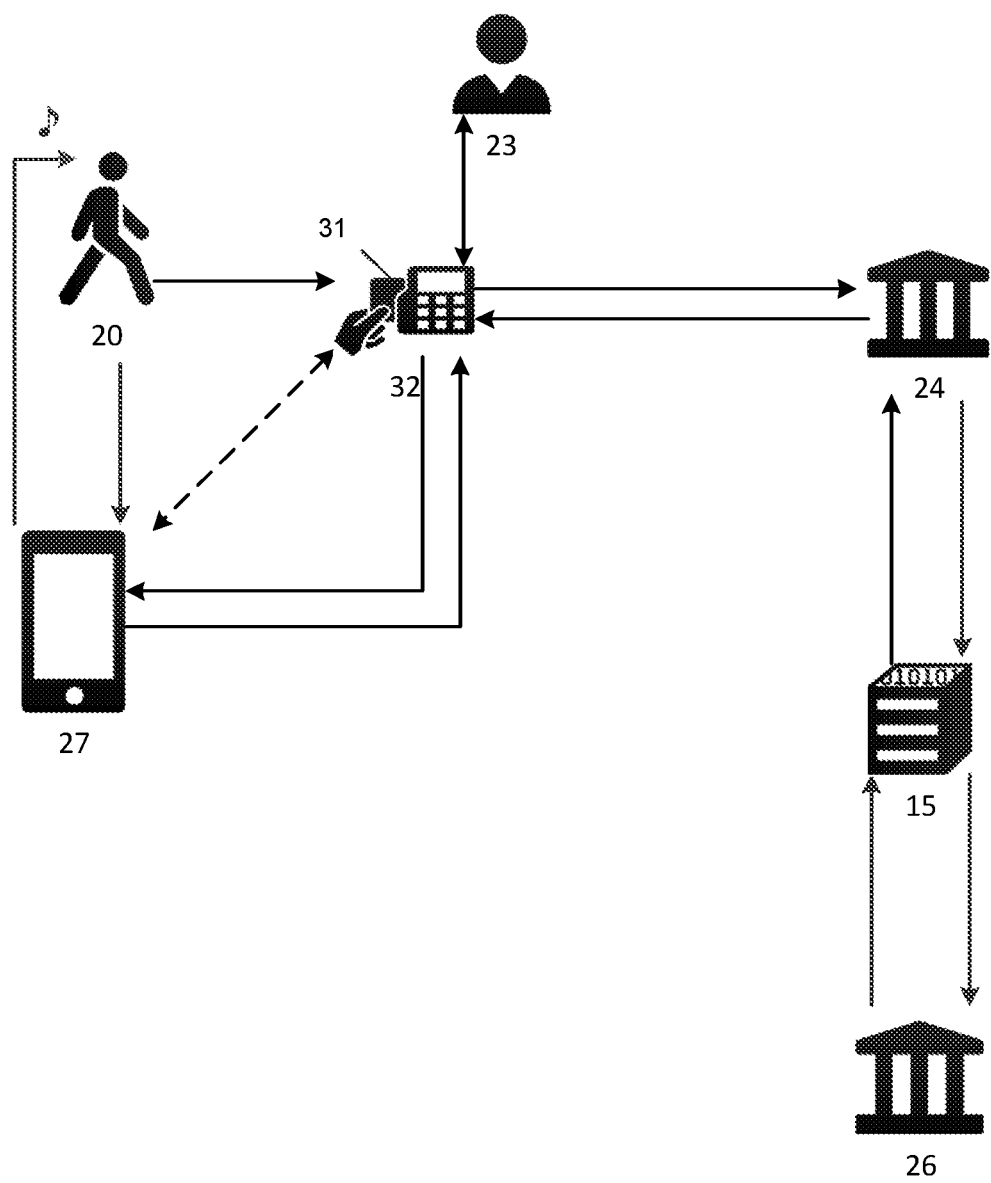
FIG. 3 shows a flowchart of the audio based amount confirmation process according to a second embodiment of the invention.

FIG. 3 shows the transaction flow between the entities involved in processing a card present transaction including the audio based amount confirmation according to the disclosure. A user 20 has concluded an enrolment process an associated his user terminal 27 with his payment card 31. The user terminal information is linked to the payment card. This information is stored on the payment card. The user terminal information includes a unique identifier and preferred communication channels to be used for communication with the user terminal.

The user 20 now wants to make a purchase in the shop of a merchant 23. For doing the payment, the user 20 decides to use a payment card and to process the payment as a card present transaction and provides the merchant 23 with his payment card 31 in order to initiate the payment transaction request. The merchant enters the payment card 31 into the POS terminal 32 and enters the necessary information for generating a payment authorisation request for processing the payment. The information added includes the payment amount. The POS terminal 32 reads out the payment card information needed for processing the payment and, in addition, also the user terminal information.

After having read the user terminal information, the POS terminal 32 initiates a communication channel with the user terminal 27 corresponding to the user terminal information and the capabilities of the POS terminal 32. After the communication channel is created, the POS terminal transmits a notification message created on the POS terminal 32 responsive top the entry of the payment amount to the user terminal 27. The content of the message includes at least the payment amount of the payment corresponding to the purchase, which needs confirmation.

At the user terminal 27, the content of the notification message is converted into audio data. Typically, the conversion of the notification data into audio data is done by a dedicated application installed and executed on the user terminal. The conversion process is triggered by reception of the notification message. The generated audio data is presented to the user 20 by the dedicated application making use of the sound reproduction means available at the user terminal. Accordingly, at least the amount of the payment, but also additional information such as merchant identification and the like, is presented as audio reproduction of the information to the user. After presentation of the audio data, the dedicated application prompts the user 20 for confirmation or decline of the payment amount. By this, the user 20 con confirm or decline whether the payment amount entered by the merchant is correct or not. In addition, depending on the security settings made during the enrolment process and/or made during initialisation of the application on the user terminal 27, user authentication is prompted by the application.

Subsequently, a response message is created. The response message comprises either the confirmation or the decline based on the user reaction. The response message is sent back to the POS terminal 32. Depending on the content of the response message, the POS terminal either continues processing the payment, when the response message is confirmative, by creating and transmitting a payment authorisation request to the acquirer 24 which is than processed further. The payment authorisation request may include the payment amount confirmation given by the user.

Alternatively, if the response message indicated decline of the payment amount, the POS terminal 32 generates an adjustment message. The adjustment message triggers the generation of an invitation to adjust the payment amount to be displayed on the POS terminals display. After amendment of the payment amount by merchant 23, the process is reinitiated.

Figure 4:
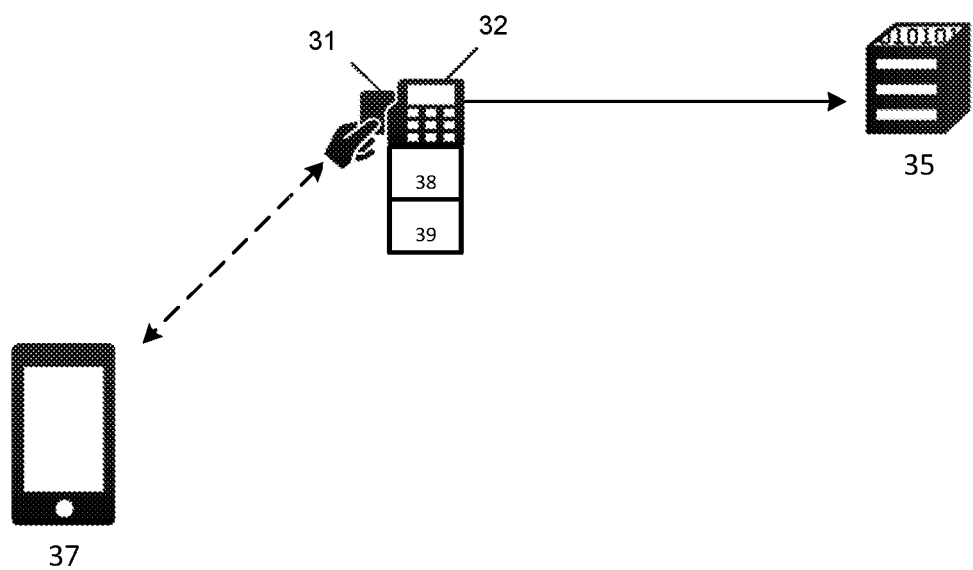
FIG. 4 shows a system for audio based amount confirmation.

FIG. 4 shows a system for amount confirmation for a user of a payment card requesting a payment transaction. The system comprises a POS terminal 32 configured to communicate with a payment card 31. The POS terminal comprises additional communication means 39 for communication with a user terminal 37. The POS terminal 32 reads our user terminal information from the payment card and establishes a communication channel with the user terminal 37 based on the user terminal information stored on the payment card 31.

The POS terminal may optionally comprise additional communication means 38 for communicating with a network. Payment authorisation requests to be processed are send via the communication channels provided by the additional communication means 38.

The POS terminal 32 is further configured to generate a notification message after payment card information is read out and after a payment amount has been added in order to process a payment. The notification message is then sent to the user terminal 27 via the established communication channel. The POS terminal 32 is further configured to receive a response message from the user terminal 27 and, responsive thereto, to either generate the payment authorisation request for processing the payment or an adjustment message. If an adjustment message is generated, at least part of the message is displayed on the POS terminal 32 in order to invite the merchant to correct or amend the payment amount. After an amended payment amount has been added at the POS terminal 32, the confirmation message is reinitiated. According to this, a new notification message, containing the amended payment amount, is generated and transmitted to the user terminal for confirmation by the user.

The system may further comprise a confirmation application installed and executed on the user terminal 27. The confirmation application is initiated responsive to receiving the notification message from the POS terminal 32. The confirmation application converts at least part of the content of the notification message into audio data which is than reproduced making use of the reproduction means of the user terminal. The confirmation application also asks the user of the user terminal for confirmation of the payment amount. The confirmation application may also ask for user authentication in order to proceed with the confirmation process. The confirmation application generates a response message, including the input given by the user, i.e. confirmation or decline of the payment amount, and transmits the response message back to the POS terminal 32. At the POS terminal 32, the process is continued as described above.

This description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

The invention claimed is:

1. A method for audio based amount confirmation for a visually impaired user of a payment card requesting a payment transaction, the method comprising:
   during a process of enrolment, linking user terminal information of the visually impaired user to the payment card and storing the linked user terminal information in a database associated with a payment card issuer, the linked user terminal information including an identifier of a user terminal;
   accessing the payment card and entering a payment amount associated with the payment transaction;
   based on the stored user terminal information, sending, using at least the identifier of the user terminal, a notification message to the user terminal, the notification message having a content, the content comprising at least the payment amount;
   converting, at the user terminal responsive to receiving the notification message, at least a part of the content, including the payment amount, into audio data;
   presenting the audio data to the visually impaired user;
   prompting, based on the enrolment, and responsive to presenting the audio data to the visually impaired user, payment confirmation or decline by the visually impaired user;
   based on user input, generating a response message comprising the payment confirmation or decline;
   upon the response message comprising the payment confirmation, processing the payment transaction for payment of the payment amount;
   upon the response message comprising the payment decline, determining whether the response message includes a corrected payment amount; and
   upon the response message including the corrected payment amount, reinitiating a payment amount confirmation process based on the corrected payment amount.

2. The method according to claim 1, wherein reinitiating the payment amount confirmation process comprises generating a new notification message based on the corrected payment amount and sending to the user terminal the new notification message.

3. The method according to claim 1, wherein the notification message is sent from the payment card issuer, through a communication network indicated as an available communication network in the user terminal information, to the user terminal.

4. The method according to claim 1, wherein the response message is sent through a payment processing network to the payment card issuer.

5. The method according to claim 1, wherein linking the user terminal information to the payment card comprises associating the payment card to the user terminal for a defined time period.

6. The method according to claim 1, wherein the user terminal information is stored on the payment card during the enrolment process.

7. The method according to claim 6, wherein based on the user terminal information being stored on the payment card, a transaction terminal reads out the user terminal information while accessing the payment card.

8. The method according to claim 7, wherein the payment card is a near-field communication enabled soft card installed on the user terminal.

9. The method according to claim 7, wherein the transaction terminal communicates with the user terminal via near-field communication.

10. The method according to claim 2, wherein, responsive to receiving the response message at a transaction terminal, the new notification message is generated at the transaction terminal.

11. The method according to claim 1, wherein the method further comprises determining whether the linked user terminal information is stored in the database, and upon determining that the linked user terminal information is stored in the database, using the linked user terminal information to send the notification message.

12. A computer readable medium storing program instructions for audio based amount confirmation for a visually impaired user of a payment card requesting a payment transaction, which, when executed by a processor of a computer, cause the computer to perform:
   associating, during a process of enrolment, the payment card to a user terminal of the visually impaired user, the associating comprising linking user terminal information to payment card information;
   accessing the payment card and entering a payment amount associated with the payment transaction;
   based on the user terminal information being linked to the payment card information, and the payment amount, sending to the user terminal, a notification message, wherein based on the enrolment, the user terminal is configured to convert the notification message into audio data, present the audio data to the visually impaired user, and prompt the visually impaired user to respond to audio data with a response message;
   receiving the response message comprising payment confirmation or decline;
   upon the response message comprising the payment confirmation, processing the payment transaction for payment of the payment amount; and
   upon the response message comprising the payment decline, generating an adjustment message to be displayed to a merchant associated with the payment transaction and prompting an amendment of the payment amount.

13. The computer readable medium according to claim 12, wherein the user terminal information includes an identifier of the user terminal, and the user terminal information is stored in a database associated with a payment card issuer, during the enrolment process.

14. The computer readable medium according to claim 12, wherein the response message comprises the payment decline, and includes a corrected payment amount and the adjustment message includes the corrected payment amount.

15. The computer readable medium according to claim 14, wherein the instructions, when executed by a processor of the computer, cause the computer to further perform:
   reinitiating a payment amount confirmation process based on the corrected payment amount.

16. The computer readable medium according to claim 15, wherein reinitiating the payment amount confirmation process comprises generating a new notification message based on the corrected payment amount and sending to the user terminal the new notification message.

17. A system for amount confirmation for a visually impaired user of a payment card requesting a payment transaction, the system comprising:
   at least one processor; and
   at least one computer readable medium storing computer-executable instructions, which, when executed by the at least one processor, cause the at least one processor to:
      associate, during a process of enrolment, the payment card to a user terminal of the visually impaired user, the associating comprising linking user terminal information to payment card information;
      access the payment card and enter a payment amount associated with the payment transaction;
      based on the user terminal information being linked to the payment card information, and the payment amount, send to the user terminal, a notification message, wherein, based on the enrolment, the user terminal is configured to convert the notification message into audio data, present the audio data to the visually impaired user, and prompt the visually impaired user to respond to audio data with a response message;
      receive the response message comprising payment confirmation or decline;
      upon the response message comprising the payment confirmation, process the payment transaction for payment of the payment amount; and
      upon the response message comprising the payment decline, generate an adjustment message to be displayed to a merchant associated with the payment transaction and prompt an amendment of the payment amount.

18. The system according to claim 17, wherein the response message comprises the payment decline and includes a corrected payment amount, and wherein the instructions, when executed by the at least one processor further cause the at least one processor to:
   generate an adjustment message that includes the corrected payment amount.

19. The system according to claim 18, wherein the instructions, when executed by the at least one processor further cause the at least one processor to:
   reinitiate a payment amount confirmation process based on the corrected payment amount.

20. The system according to claim 19, wherein reinitiating the payment amount confirmation process comprises generating a new notification message based on the corrected payment amount and sending to the user terminal the new notification message.

* * * * *